United States Patent
Garot

(10) Patent No.: US 9,279,245 B2
(45) Date of Patent: Mar. 8, 2016

(54) ANCHORING ASSEMBLY, ANCHORING NUT FOR USE IN AN ANCHORING ASSEMBLY AND THE USE OF AN ANCHORING ASSEMBLY FOR ANCHORING A LINER OF A CURED LINING MATERIAL

(71) Applicant: Silicon Refractory Anchoring Systems B.V., Wateringen (NL)

(72) Inventor: Wouter Garot, The Hague (NL)

(73) Assignee: SILICON REFRACTORY ANCHORING SYSTEMS B.V., Wateringen (NL)

( * ) Notice: Subject to any disclaimer, the term of this patent is extended or adjusted under 35 U.S.C. 154(b) by 0 days.

(21) Appl. No.: 13/937,414

(22) Filed: Jul. 9, 2013

(65) Prior Publication Data
US 2015/0013264 A1    Jan. 15, 2015

(51) Int. Cl.
 *E04B 1/38* (2006.01)
 *E04B 1/41* (2006.01)
 *F16B 37/02* (2006.01)
 *F16B 37/04* (2006.01)

(52) U.S. Cl.
 CPC ............. *E04B 1/4121* (2013.01); *E04B 1/4157* (2013.01); *E04B 1/41* (2013.01); *E04B 1/4178* (2013.01); *F16B 37/02* (2013.01); *F16B 37/04* (2013.01)

(58) Field of Classification Search
 CPC ....... E04B 1/4121; E04B 1/4157; E04B 1/41; E04B 1/4128; F16B 35/06; F16B 19/02; F16B 25/0094; F16B 35/044; F16B 37/00; F17C 2203/0604

USPC ............ 52/124.2, 125.3–125.5, 126.4, 126.7, 52/699–701, 704
See application file for complete search history.

(56) References Cited

U.S. PATENT DOCUMENTS

| | | | | |
|---|---|---|---|---|
| 1,088,290 | A | * | 2/1914 | McAllister ....................... 52/699 |
| 1,114,724 | A | * | 10/1914 | Blackburn ....................... 52/166 |
| 4,107,890 | A | * | 8/1978 | Seghezzi et al. ................ 52/379 |
| 4,325,575 | A | * | 4/1982 | Holt et al. ......................... 294/89 |
| 4,569,659 | A | * | 2/1986 | Olsen et al. .................... 432/119 |
| 5,353,503 | A | * | 10/1994 | Garot ............................ 29/897.3 |
| 6,079,179 | A | * | 6/2000 | Shoemaker, Jr. ................ 52/699 |
| D706,127 | S | * | 6/2014 | Hohmann, Jr. .................. D8/398 |
| 2009/0169332 | A1 | * | 7/2009 | Suehiro et al. ................. 411/367 |
| 2012/0291390 | A1 | * | 11/2012 | Hohmann, Jr. .................. 52/565 |

FOREIGN PATENT DOCUMENTS

CA    2509922 A1 * 12/2005

* cited by examiner

*Primary Examiner* — Brian Glessner
*Assistant Examiner* — Omar Hijaz
(74) *Attorney, Agent, or Firm* — Shumaker Loop & Kendrick, LLP

(57) ABSTRACT

An anchoring assembly for anchoring a liner of a cured lining material arranged to be applied in liquid form to a metal object provided with the anchoring assembly, the anchoring assembly comprising an elongated mounting pin, which elongated mounting pin is arranged to be mounted, at a first end, to the metal object, and a plurality of spaced anchor fins, wherein the plurality of spaced anchors fins are connected to the elongated mounting pin at a second end and extend radially outwardly with respect to the elongated mounting pin.

15 Claims, 3 Drawing Sheets

ANCHORING ASSEMBLY, ANCHORING NUT FOR USE IN AN ANCHORING ASSEMBLY AND THE USE OF AN ANCHORING ASSEMBLY FOR ANCHORING A LINER OF A CURED LINING MATERIAL

FIELD OF THE INVENTION

The present invention generally relates to an anchoring assembly for anchoring a liner of a cured lining material applied in liquid form to a metal object provided with the anchoring assembly, and more specifically relates to an anchoring assembly for anchoring concrete linings.

BACKGROUND OF THE INVENTION

Two categories of anchoring assemblies can be distinguished, those that are mounted on a metal object before lining material in liquid form is applied, and those that are pre-installed in cured lining material. Both categories comprise a variety of different types of anchor assemblies, all of which transfer loads from the anchor assembly to the cured lining material in a variety of ways, which at least depends on the actual design of the anchor assemblies.

The above-mentioned loads are considered to be either static or dynamic. Static loads comprise, for example, tension, shear, or a combination of both. Dynamic loads on the other hand comprise, for example, seismic, fatigue, wind and/or shock. The design of an anchor assembly determines whether it is suitable or unsuitable for the above mentioned load types.

Several techniques are known in the art to transfer the load, such as keying, friction and bonding techniques. Keying, for example, is considered to be the direct transfer of a load from the anchor assembly into the cured lining material by bearing forces in a same direction of loading the anchor assembly.

Friction is based on transferring a load through friction between expansion sleeves of the anchor assembly and the wall of the drilled hole in the concrete. The effect is similar as is reached by a standard plug in a wall. Finally, bonding takes place when resins or grouts are used around the anchor, which is usually the case with post-installed anchor assemblies.

The present invention is related to an anchoring assembly which is or is to be provided on a metal object before the lining material in liquid form is applied.

A known anchoring assembly comprises an elongated mounting pin arranged to be mounted, at a first end, to a metal object, and a plate shaped second end having a through hole for anchoring the liner. Once such an anchoring assembly has been welded to the metal object, pouring of the liner, for example cement, can take place. The concrete will enter the through hole, resulting in an improved anchoring. Alternatively an anchoring element can be inserted in the through hole, wherein the anchoring element provides an improved anchoring performance.

A drawback of the known anchoring assembly is that the load each elongated mounting pin is able to transfer to the cured lining material is limited. In order for a metal object to be firmly anchored in the cured lining material, many of these known mounting elements are required such that the total load to be transferred is distributed over many individual mounting elements.

Accordingly, it is an object of the present invention to provide for an anchoring assembly which is arranged to transfer a larger load to the cured lining material compared to these known anchoring assemblies.

BRIEF SUMMARY OF THE INVENTION

In order to accomplish that object, the invention, according to a first aspect thereof, provides for an anchoring assembly for anchoring a liner of a cured lining material applied in liquid form to a metal object provided with the anchoring assembly, wherein the anchoring assembly comprises an elongated mounting pin, which elongated mounting pin is arranged to be mounted, at a first end, to the metal object, and a plurality of spaced anchor fins, wherein the plurality of spaced anchors fins are connected to the elongated mounting pin at a second end and extend radially outwardly with respect to the elongated mounting pin.

The invention is based on the perception that the total load an individual anchoring assembly is able to transfer to the cured lining material is increased in case the anchoring assembly is provided with a plurality of spaced anchor fins extending radially outwardly with respect to the elongated mounting pin.

The inventors noted that an increase in total load transfer is achieved by incorporating two interrelated aspects. Firstly, providing the anchoring assembly with a plurality of spaced anchor fins is beneficial, as the load transfer capability per individual anchor fin may be accumulated. Secondly, the load transfer capability per individual anchor fin is improved in case an anchor fin is extending radially outwardly with respect to the elongated mounting pin as in such a manner, the anchor fins have an improved connection with the cured lining material. In other words, the bonding of the anchor fins with the cured lining material is improved.

Extending radially outwardly with respect to the elongated mounting pin means, in an example, that the spaced anchor fins are oriented substantially parallel to the metal object when the anchoring assembly is mounted on the metal object. As such, the spaced anchor fins are oriented transversely compared to the elongated direction of the mounting pin.

The anchor fins are spaced relative to each other which means that the individual anchor fins are not directly interconnected. In an example of the invention, the anchor fins are indirectly connected to each other via the elongated mounting pin.

In a practical example of the present invention, applying lining material in liquid form to a metal object comprises pouring and/or ramming concrete onto the metal object.

In an embodiment of the present invention, the anchoring assembly further comprises a nut, wherein the plurality of spaced anchor fins are welded or soldered to the nut, and wherein the nut is to be mounted on the elongated mounting pin at the second end.

In such a case, the anchor fins are thus indirectly interconnected via the nut. The advantage of the embodiment described above is that the nut having the spaced anchor fins attached thereto, can be mounted onto the mounting pin in a quick and simple manner, for example in situ. The elongated mounting pin may be mounted, for example (spot)-welded or (spot)-soldered, on the metal object before the metal object is transported to the building site, where the nut is to be mounted. A construction worker is then able to decide, in situ, which embodiment of a nut according to the present invention is to be mounted on the mounting pin. As such, it is no longer necessary to determine which type of nut is to be used at a building site beforehand, as the present invention allows the nut to be mounted on the elongated mounting pin in situ.

In a further embodiment of the present invention, the nut and the second end of the elongated mounting pin comprise screw threads, and the nut is to be mounted on the elongated mounting pin via the screw threads. Using screw threads on the nut and the second end of the pin even further simplifies the mounting of the nut on the elongated mounting pin.

In yet another embodiment of the present invention, a side of at least one of said plurality of spaced anchor fins at which the at least one spaced anchor fin is connected to the elongated mounting pin, is tapered or notched. The inventors noted that in case these sides of the anchor fins are not tapered or notched, the cured lining material situated between the spaced anchor fins, above the nut, has the potential to spall and pop out.

In a further embodiment of the present invention, the anchoring assembly comprises two to twelve spaced anchor fins, preferably four to eight spaced anchor fins, and even more preferably six spaced anchor fins.

In a next embodiment of the present invention, the at least one of the plurality of spaced anchor fins comprises at least one of a through hole and an element having a component extending in an angle from the spaced anchor fins, for example tangentially, radially or circumferentially.

Such an element may comprise, for example, a protrusion, a hook, a bulge and a thickening for firmly anchoring the cured lining material. According to the present invention, these spaced anchor fins may all have an identical form, but the form may also vary over the different anchor fins. For example, in order to make the anchoring assembly more suitable for different types of loads, different forms of spaced anchor fins may be chosen, wherein each form of spaced anchor fin is designed for a different type of load. For the same reason, also the elements having a component extending in an angle from the spaced anchor fins may be identical or may differ.

In a further embodiment of the present invention, the spaced anchor fins are tangentially evenly distributed around the elongated mounting pin. The advantage of the embodiment described above, is that the force the anchoring assembly asserts on the metal object, and thus also on the mounting of the anchoring assembly at the metal object, is tangentially evenly distributed which prevents breaking of the mounting.

In a practical implementation of the present invention, the maximum dimension of a cross section of the anchoring assembly is between thirty millimeters and fifty millimeters, and the length of the mounting pin is between fifteen and fifty millimeters.

In another embodiment of the present invention, the elongated mounting pin is made of stainless steel. This renders the anchoring assembly suitable for applications in which corrosion can affect the quality of the anchoring assembly. For the same reason the stud and the spaced anchor fins may be made of stainless steel.

In a second aspect of the present invention, there is provided an anchoring nut suitable for anchoring a liner of a cured lining material applied in liquid form to a metal object provided with an elongated mounting pin, wherein the anchoring nut is arranged to be mounted on said elongated mounting pin, wherein the anchoring nut comprises a plurality of spaced anchor fins extending radially outwardly from the anchoring nut.

In an embodiment thereof, the anchoring nut comprises a screw thread, and the nut is arranged to be mounted on the elongated mounting pin via the screw thread.

According to a third aspect, the present invention relates to the use of an anchoring assembly according to an embodiment of the present invention for anchoring a liner of a cured lining material arranged to be applied in liquid form to a metal object provided with said anchoring assembly.

The invention will now be explained in more detail with reference to the appended figures, which merely serve by way of illustration of the invention and which must not be construed as being limitative thereto.

DETAILED DESCRIPTION OF THE INVENTION

Figure 1A:
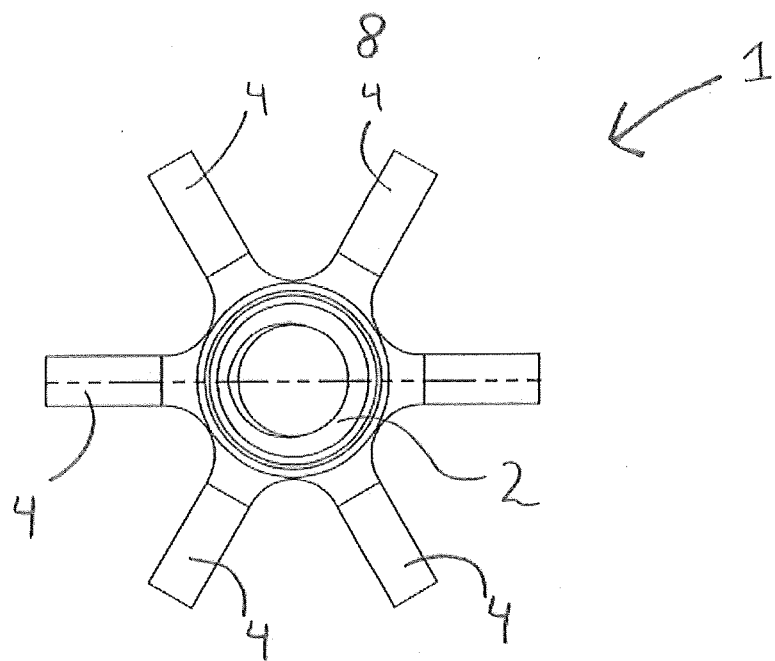
FIGS. 1a and 1b show, in a schematic form, respectively a top view and a side view of an example of an embodiment of an anchoring nut according to the present invention.
Figure 1B:
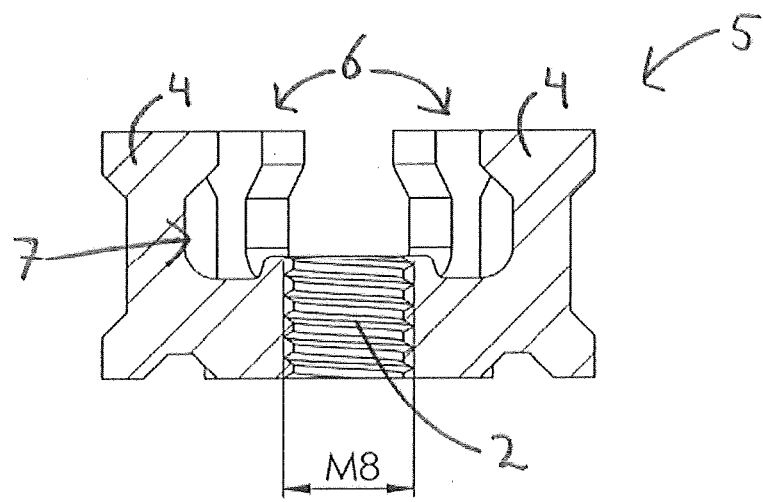

FIGS. 1a and 1b show, in a schematic form, different views of an example of an anchoring nut 2 according to the present invention, i.e. a top view 1 and a side view 5.

The anchoring nut 2 comprises a plurality of spaced anchor fins 4 extending radially outwardly from the anchoring nut 2. In the present example, the anchoring nut 2 is provided with a screw thread for screwing the nut onto an elongated mounting pin (not shown) which mounting pin is attached to a metal object.

In the context of the present invention, the wording spaced means that the anchor fins 4 are each separately identifiable, i.e. each individual fin 4 is directly connected to either the elongated mounting pin or the anchoring nut 2.

As is clear from the top view 1 of the anchoring nut 2, the spaced anchor fins are tangentially evenly distributed around the anchoring nut 2. This means that the (tangential) distance between the separate anchor fins 4 are substantially equal. The advantage of this feature is that the load is distributed evenly over the fins 4, and that the direction of the force of the load is substantially aligned with the mounting pin.

In the present example, the top side 6 of the spaced anchor fins 4 are aligned, such that the cured lining material applied in liquid form to a metal object provided with an elongated mounting pin having the anchoring nut mounted thereon, is levelled with the cured lining material. The inventors noted that in case the topside 6 of the spaced anchor fins 4 are not aligned, the cured lining material may chip and cause holes.

Further, the side 7 of the spaced anchor fins 4 at which the spaced anchor fins 4 are connected to the elongated mounting pin is tapered, such that the probability that the cured lining material present above the anchoring nut 2 and the spaced anchor fins 4 to spall and pop out is reduced.

The largest diameter 8 of the anchoring nut 2, in the present example, is 30 millimeter, providing easy transportation and installation of the nut 2.

Figure 2A:
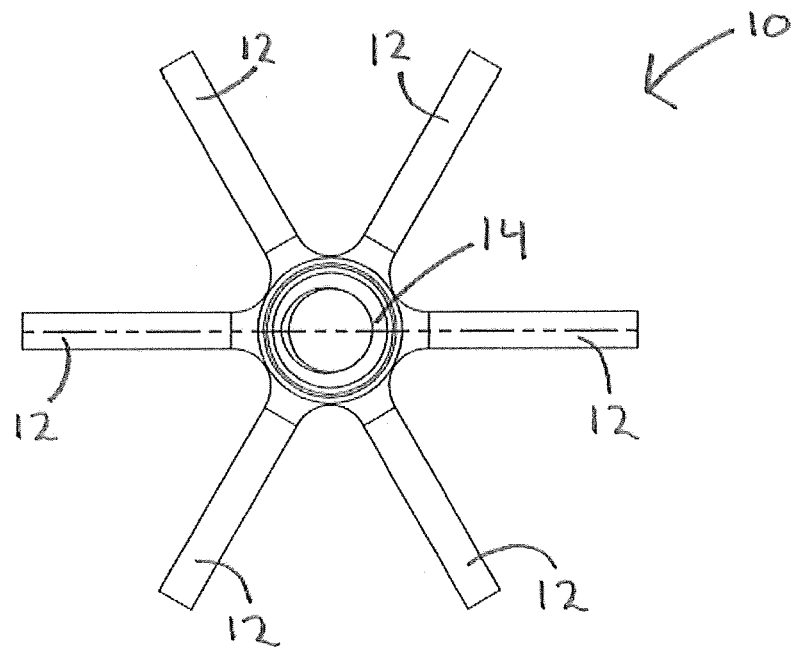
FIGS. 2a and 2b show, in a schematic form, respectively a top view and a side view of an example of another anchoring nut, according to an embodiment of the present invention.
Figure 2B:
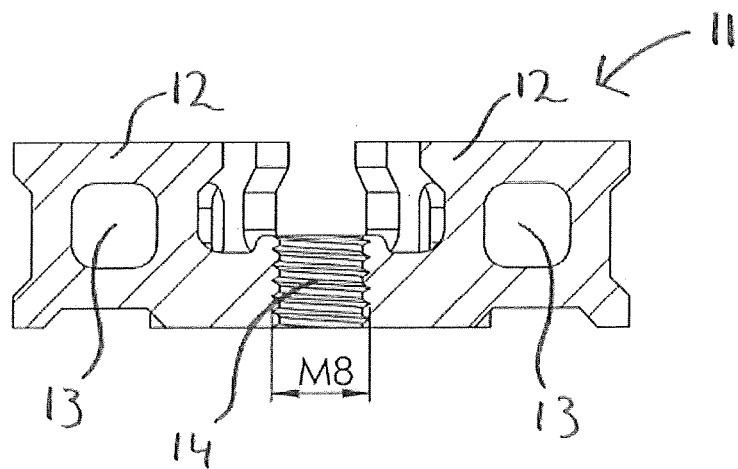

FIGS. 2a and 2b show, in a schematic form, respectively a top view 10 and a side view 11 of another example of an anchoring nut 14 according to an embodiment of the present invention.

The difference between the anchoring nut 14 shown in FIG. 2 and the anchoring nut 4 shown in FIG. 1, is that the in the present example, the spaced anchor fins 12 are each provided with a through hole 13, such that the weight of the nut is reduced and the load transfer capability of the nut is increased as the cured lining material is present in the through holes 13.

Figure 3:
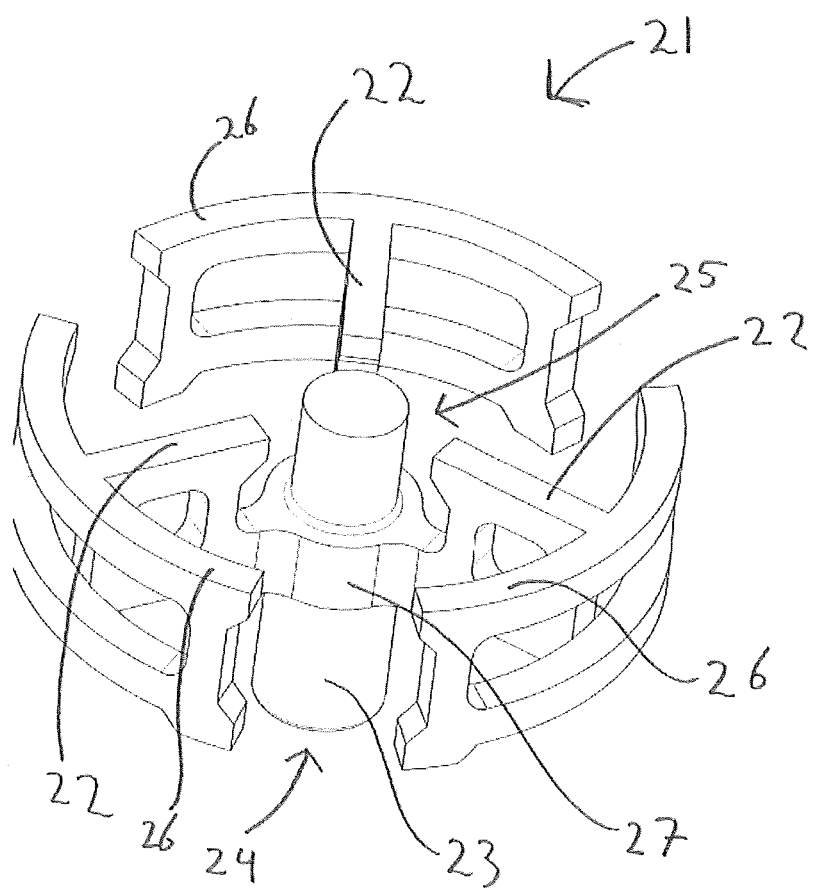
FIG. 3 shows, in a schematic form, an example of an anchoring assembly according to an embodiment of the present invention.

FIG. 3 shows, in a schematic form, an example of an anchoring assembly 21 according to an embodiment of the present invention.

The anchoring assembly 21 is used for anchoring a liner of a cured lining material arranged to be applied in liquid form to a metal object (not shown) provided with the anchoring assembly 21. The anchoring assembly comprises an elongated mounting ping 23, which mounting pin 23 is arranged to be mounted, at a first end 24, to the metal object.

The anchoring assembly further comprises a plurality of anchor fins 22 connected to an anchoring nut 27. The anchoring nut 27 is further screwed (not shown) onto the mounting pin 23 at a second end 25 of the mounting pin 23.

In the present example, the anchor fins 22 each comprise additional fins 26 extending circumferentially with respect to the mounting pin 23. In other embodiments of the present invention the additional fins extend tangentially with respect to the mounting pin 23.

The present invention has been explained in the foregoing by means of a number of examples. As those skilled in the art will appreciate, several modifications and additions can be realised without departing from the scope of the invention as defined in the appended claims.

What is claimed is:

1. An anchoring assembly for anchoring a liner of a cured lining material applied in liquid form to a metal object provided with the anchoring assembly, the anchoring assembly comprising:
    an elongated mounting pin defining a vertical axis of the anchoring assembly, wherein a plurality of vertical planes extend radially outward from the vertical axis, whereby the elongated mounting pin is arranged to be mounted, at a first end, to the metal object, and
    a plurality of spaced anchor fins connected by a collar adapted to engage the elongated mounting pin, wherein the anchor fins each have a vertical portion projecting therefrom,
    wherein the plurality of spaced anchor fins are connected to the elongated mounting pin via the collar and the vertical portions of the fins extend radially outwardly from the vertical axis, coplanar with the vertical planes of the elongated mounting pin and extend above the collar, and
    a plurality of outer peripheral portions of the spaced anchor fins, wherein the outer peripheral portions are disconnected relative to one another along a circumference of the anchoring assembly, wherein:
    an overall height of the collar is less than an overall height of the outer peripheral portions of the spaced anchor fins.

2. The anchoring assembly according to claim 1, further comprising a nut, wherein the plurality of spaced anchor fins are welded or soldered to the nut, and wherein the nut is, or is to be mounted on the elongated mounting pin at the second end.

3. The anchoring assembly according to claim 2, wherein the nut and the second end of the elongated mounting pin comprise screw threads, and wherein the nut is, or is to be mounted on the elongated mounting pin via the screw threads.

4. The anchoring assembly according to claim 1, wherein a side of at least one of the plurality of spaced anchor fins at which the at least one spaced anchor fin is connected to the elongated mounting pin, is tapered or notched.

5. The anchoring assembly according to claim 1, wherein the anchoring assembly comprises 2 to 12 anchor fins.

6. The anchoring assembly according to claim 1, wherein the anchoring assembly comprises 4 to 8 anchor fins.

7. The anchoring assembly according to claim 1, wherein the anchoring assembly comprises 6 anchor fins.

8. The anchoring assembly according to claim 1, wherein at least one of the plurality of spaced anchor fins comprises at least one of a through hole and an element having a component extending in an angle from the anchor fin.

9. An anchoring assembly according to claim 1, wherein each of the plurality of anchor fins are identical in form.

10. An anchoring assembly according to claim 1, wherein the spaced anchor fins are tangentially evenly distributed around the elongated mounting pin.

11. An anchoring assembly according to claim 1, wherein a maximum dimension of a cross section of the anchoring assembly is between 30 mm and 50 mm.

12. An anchoring assembly according to claim 1, wherein the elongated mounting pin is arranged to be welded or soldered, at the first end, to the metal object.

13. An anchoring assembly according to claim 1, wherein the elongated mounting pin is made of stainless steel.

14. An anchoring nut for anchoring a liner of a cured lining material arranged to be applied in liquid form to a metal object provided with an elongated mounting pin defining a vertical axis and mounted with the anchoring nut,
    wherein a plurality of vertical planes extend radially outward from the vertical axis, the anchoring nut comprises a plurality of spaced anchor fins connected by a collar adapted to engage the elongated mounting pin, wherein the anchor fins each have a vertical portion projecting therefrom, wherein the vertical portions of the fins extend radially outwardly from the vertical axis, coplanar with the vertical planes of the elongated mounting pin and extend above the collar, and
    a plurality of outer peripheral portions of the spaced anchor fins, wherein the outer peripheral portions are disconnected relative to one another along a circumference of the anchoring assembly, wherein:
    an overall height of the collar is less than an overall height of the outer peripheral portions of the spaced anchor fins.

15. An anchoring nut according to claim 14, wherein the anchoring nut comprises a screw thread, and wherein the nut is arranged to be mounted on the elongated mounting pin via the screw thread.

* * * * *